(12) United States Patent
Numata

(10) Patent No.: US 8,392,015 B2
(45) Date of Patent: Mar. 5, 2013

(54) PROCESSING METHOD FOR A WORKPIECE

(75) Inventor: Atsushi Numata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/826,858

(22) Filed: Jun. 30, 2010

(65) Prior Publication Data

US 2011/0010004 A1 Jan. 13, 2011

(30) Foreign Application Priority Data

Jul. 10, 2009 (JP) ................................. 2009-163752

(51) Int. Cl.
*G06F 19/00* (2011.01)
(52) U.S. Cl. ........................................ 700/186; 700/175
(58) Field of Classification Search .................. 700/164, 700/166, 174–175, 186, 188
See application file for complete search history.

(56) References Cited

U.S. PATENT DOCUMENTS 5,573,446 A * 11/1996 Dey et al. ......................... 451/39
5,599,423 A * 2/1997 Parker et al. ................... 438/692

FOREIGN PATENT DOCUMENTS

JP 10-337638 A 12/1998

OTHER PUBLICATIONS

Mahito Negishi, et al., "Studies on Super-Smooth Polishing (2nd Report)—Deconvolution Algorithm for Corrective Polishing", Journal of Japan Society of Precision Engineering, 1996, pp. 408-412, vol. 62, No. 3.

* cited by examiner

*Primary Examiner* — Sean Shechtman
(74) *Attorney, Agent, or Firm* — Fitzpatrick, Cella, Harper & Scinto

(57) ABSTRACT

A method for processing a workpiece in which a tool smaller than the workpiece is caused to scan the workpiece includes the steps of dwelling a tool on a dummy work for a predetermined time to process the dummy work, measuring the dummy work to determine a unit removal shape, causing the tool to scan the dummy work, and processing the dummy work while continuously changing a dwell time of the tool so that the dwell time is a linear function with respect to a scanning position of the tool. Additional processing steps include measuring a change of a depth or volume of a removal shape processed in the dummy work, to thereby determine a removal rate corresponding to a continuous change of the dwell time of the tool, determining a tentative dwell time to dwell the tool at respective processed points from a target removal shape of the workpiece and the unit removal shape, determining the removal rate corresponding to the tentative dwell time at the respective processed points, and determining a true dwell time at the respective processed points from the removal rate at the respective processed points. The tool dwells for the true dwell time at the respective processed points to process the workpiece.

6 Claims, 6 Drawing Sheets

PROCESSING METHOD FOR A WORKPIECE

BACKGROUND OF THE INVENTION

1. Field of the Invention

The present invention relates to a method for processing a workpiece (an object to be processed) into an optical device or an optical device molding die by using a tool smaller than the workpiece.

2. Description of the Related Art

As a processing method for accurately finishing a shape of an optical device or an optical device molding die, there is known a shape correction processing method for processing a workpiece while causing a tool such as a polishing pad and an ion beam, which is smaller than the workpiece, to scan the workpiece. In the shape correction processing method, first, a shape of the workpiece that is still unprocessed is measured, and an amount of error of the workpiece from a target shape is grasped in advance. The amount of error corresponds to a target shape to be removed (target removal shape) for approximating the shape of the workpiece to the target shape. Further, a unit shape to be removed (unit removal shape), which is a spotting mark per unit time of the tool, is grasped in advance through preprocessing. The unit removal shape defines a removal profile of the tool with respect to the workpiece. At the same time, the unit removal shape defines a removal rate indicating a relationship between a dwell time of the tool and a depth or volume of such a removal shape formed in the workpiece.

Then, a dwell time distribution of the tool, which is set for approximating the shape of the workpiece to the target shape, is calculated based on the target removal shape and the unit removal shape. The tool is caused to scan the workpiece while controlling a scanning speed thereof according to the dwell time distribution, whereby the shape of the workpiece is approximated to the target shape (refer to Japanese Patent Application Laid-Open No. H10-337638).

The dwell time distribution is one of main factors to determine accuracy of the shape correction processing. Hence, accuracy of the removal rate for use in calculating the dwell time distribution becomes a main factor to directly influence the accuracy of the shape correction processing.

In the conventional processing method, the removal rate indicating the relationship between the dwell time of the tool and the depth or volume of the removal shape formed in the workpiece is defined only by the unit removal shape. The unit removal shape is the spotting mark per unit time, and therefore, the removal rate is defined only by the unit time. This definition is made on the premise that a depth of the spotting mark when the workpiece is processed for an arbitrary time is proportional to a processing time period of the workpiece while taking as a reference the unit removal shape that is the spotting mark per unit time. In other words, it is premised that the dwell time of the tool and the depth or volume of the removal shape formed in the workpiece are in a proportional relationship.

However, in the actual processing, the dwell time of the tool and the depth or volume of the removal shape formed in the workpiece are not always in the proportional relationship. For example, in the case where a layer like an affected layer, which is different from the workpiece in characteristics, is formed on a superficial layer of the workpiece, a removal rate at the time of removing the layer different in characteristics is different from that for the workpiece. Further, in the case where the workpiece has characteristics that a temperature of a processed point thereof rises as the dwell time is longer, and the removal rate is changed depending on the temperature of the processed point, a removal rate at a position where the scanning speed is slow increases more than that at a position where the scanning speed is fast. As described above, in the case where the dwell time of the tool and the depth or volume of the removal shape formed in the workpiece are not in the proportional relationship, that is, in the case where the removal rate cannot be represented by a linear function, accuracy is insufficient by the above-mentioned method in which the removal rate is defined only by the unit removal shape. In particular, in processing of an optical device and, an optical device molding die, for which high shape accuracy is required, there is a problem that the shape accuracy cannot reach a target thereof owing to the insufficient accuracy described above.

SUMMARY OF THE INVENTION

It is an object of the present invention to provide a processing method capable of stably performing high-accuracy shape correction processing through precisely grasping the relationship between the dwell time of the tool and the depth or volume of the removal shape actually formed in the workpiece.

In order to achieve the above-mentioned object, according to the present invention, a method for processing a workpiece in which a tool smaller than the workpiece is caused to scan the workpiece, the method including: causing the tool to scan a dummy work, and processing the dummy work while continuously changing a dwell time of the tool so that the dwell time is a linear function with respect to a scanning position of the tool; and measuring a change of a depth or volume of a removal shape processed in the dummy work, to thereby determine a removal rate corresponding to a continuous change of the dwell time of the tool, in which the workpiece is processed while controlling a scanning speed of the tool based on a target shape of the workpiece and on the removal rate.

The dwell time of the tool is continuously changed based on the linear function by using the dummy work, whereby the removal rate can be continuously acquired from a case where the scanning speed is fast to a case where the scanning speed is slow, that is, from a case where the dwell time is short to a case where the dwell time is long. Even if the removal rate is non-linear with respect to the dwell time, the removal rate can be accurately grasped by actually measuring the change of the removal shape, and the high-accuracy shape correction processing can be performed.

Further features of the present invention will become apparent from the following description of exemplary embodiments with reference to the attached drawings.

DESCRIPTION OF THE EMBODIMENTS

Figure 1A:
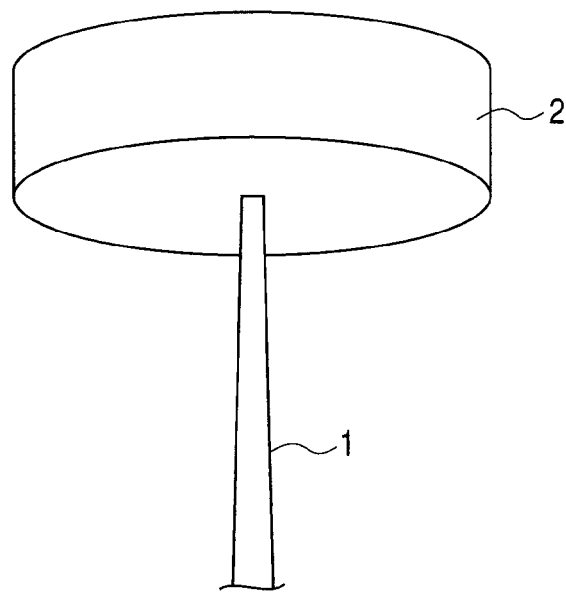
FIGS. 1A and 1B are views illustrating a unit removal shape by ion beam processing according to a conventional example.
Figure 1B:
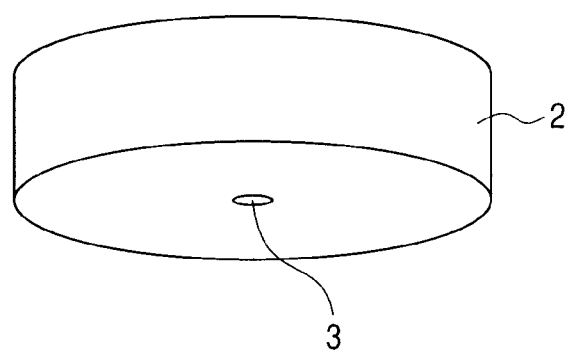

FIGS. 1A and 1B and FIGS. 2A to 2C are views for illustrating a method for grasping a removal rate, which is performed in conventional shape correction processing. As illustrated in FIG. 1A, an ion beam 1 is irradiated for a unit time onto a certain point on a workpiece 2 as a dummy work for grasping a removal rate. Then, as illustrated in FIG. 1B, a unit removal shape 3 is formed. Note that, in the following drawings, the same reference numerals denote the same members.

Figure 2A:
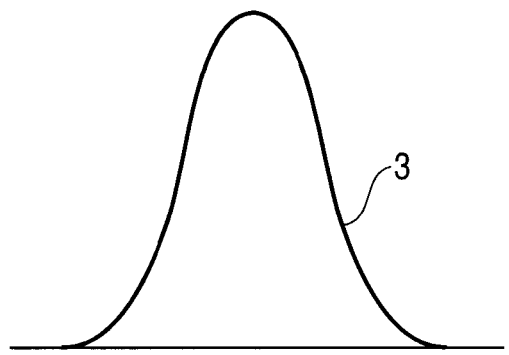
FIGS. 2A, 2B and 2C are views illustrating a relationship between a removal depth and a dwell time according to the conventional example.
Figure 2B:
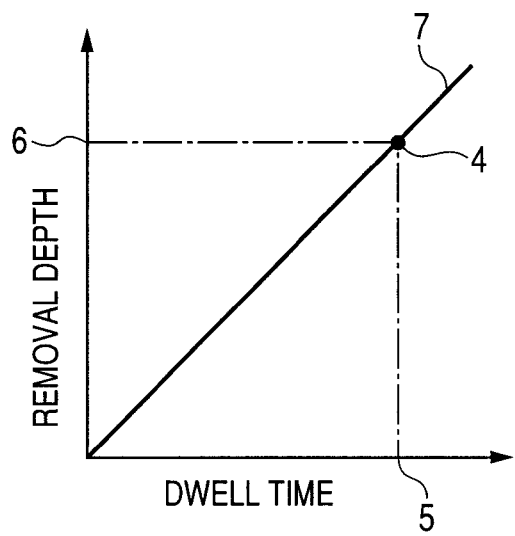

FIG. 2A is a view schematically illustrating an enlarged cross-sectional shape of the unit removal shape 3 formed in the dummy work. The unit removal shape 3 is measured by a shape measuring instrument in the subsequent step, whereby a removal depth or volume can be grasped. FIG. 2B is a graph showing a relationship of such a removal depth with respect to a change of a dwell time. The graph is drawn by using a result of measuring a depth of the unit removal shape 3. Unit removal shape processing data 4 is uniquely plotted based on a dwell time 5 while the ion beam 1 is being irradiated onto the workpiece 2 and on a removal depth 6 obtained by measuring the unit removal shape 3. In the conventional method for grasping removal rate, it is premised that the dwell time and the depth or volume of the removal shape are in a proportional relationship. In other words, the relationship between the dwell time and the removal depth are represented by a straight line that passes through the unit removal shape processing result 4 and has x and y intersects of zero. A removal rate straight line 7 indicated by solid lines in FIGS. 2B and 2C corresponds to the straight line described above.

However, in actual, the dwell time and the depth or volume of the removal shape are not always in the proportional relationship. For example, in the case where a layer like an affected layer, which is different from the workpiece in characteristics, is formed on a superficial layer of the workpiece, a removal rate at the time of removing the layer different in characteristics changes. Further, in the case where the workpiece has characteristics that a temperature of a processed point thereof rises as the dwell time is longer, and the removal rate is changed depending on the temperature of the processed point, a removal rate at a position where a scanning speed is slow is increased more than that at a position where the scanning speed is fast.

Figure 2C:
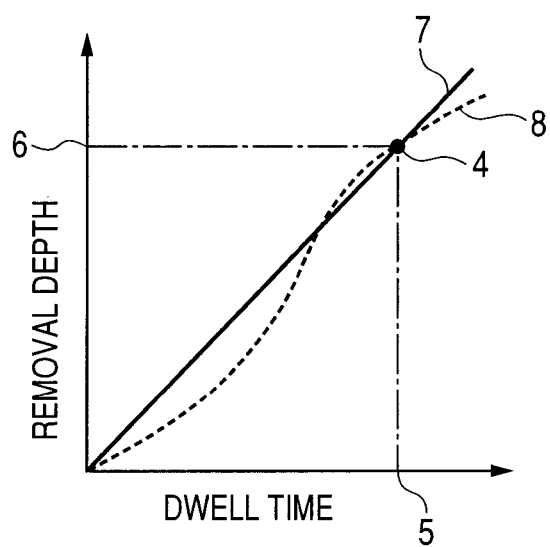

As indicated by a broken line in FIG. 2C, in a removal rate curve 8 when the workpiece is actually processed, there is no proportional relationship between the dwell time and the removal depth or the removal volume. In other words, there is a difference between the removal rate straight line 7 and the actual removal rate curve 8. In the conventional shape correction processing, a dwell time distribution is calculated by using the removal rate straight line 7. However, the actual removal depth (volume) follows the removal rate curve 8, and accordingly, an error caused by the difference between the removal rate straight line 7 and the removal rate curve 8 is included in the dwell time distribution calculated by the conventional method. In the present invention, the actual removal rate curve 8 with respect to a continuous change of the dwell time of a tool smaller than the workpiece is determined, to thereby allow an accuracy increase of the shape correction processing.

Note that, the tool smaller than the workpiece is not limited to the ion beam, and may be a polishing pad, magnetic fluid, an elastic emission machining (EEM) tool, jetted liquid, etching plasma, a laser beam, or the like.

Example 1

Figure 3A:
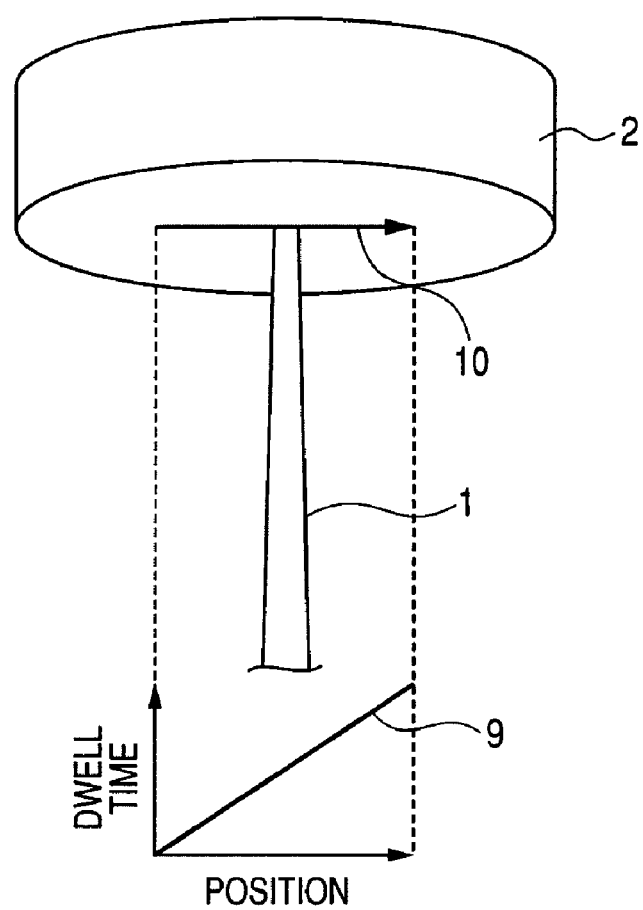
FIGS. 3A and 3B are views illustrating line processing and a removal shape according to Example 1.

FIGS. 3A and 3B and FIGS. 4A and 4B are views according to a processing method according to Example 1. First, as illustrated in FIG. 3A, the ion beam 1 as the tool is caused to scan the workpiece 2 as the dummy work along a line 10 while continuously changing a dwell time 9 thereof based on a linear function with respect to a scanning position thereof. In this way, the removal shape with respect to the dwell time is determined.

In Example 1, the ion beam 1 is used as the tool. However, as a matter of course, the tool is not limited to the ion beam, and a polishing pad, magnetic fluid, an elastic emission machining (EEM) tool, jetted liquid, etching plasma, a laser beam, or the like may be used as the tool. The workpiece 2 as the dummy work is made of the same material as that for a workpiece to be processed in actual processing. For example, an optical device material including a quartz glass and a low thermal expansion glass, an optical device molding die material including cemented carbide and ceramic, or a semiconductor material including silicon and silicon carbide may be used.

Figure 3B:
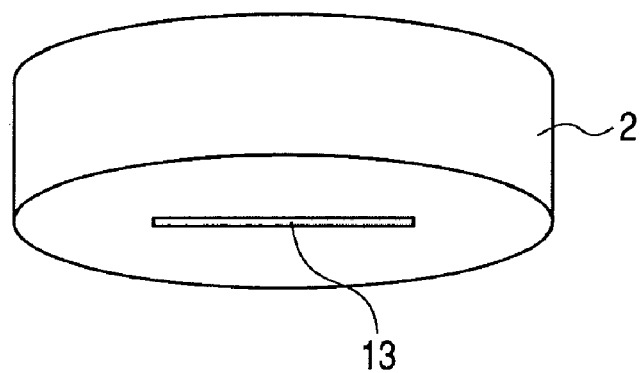
Figure 4A:
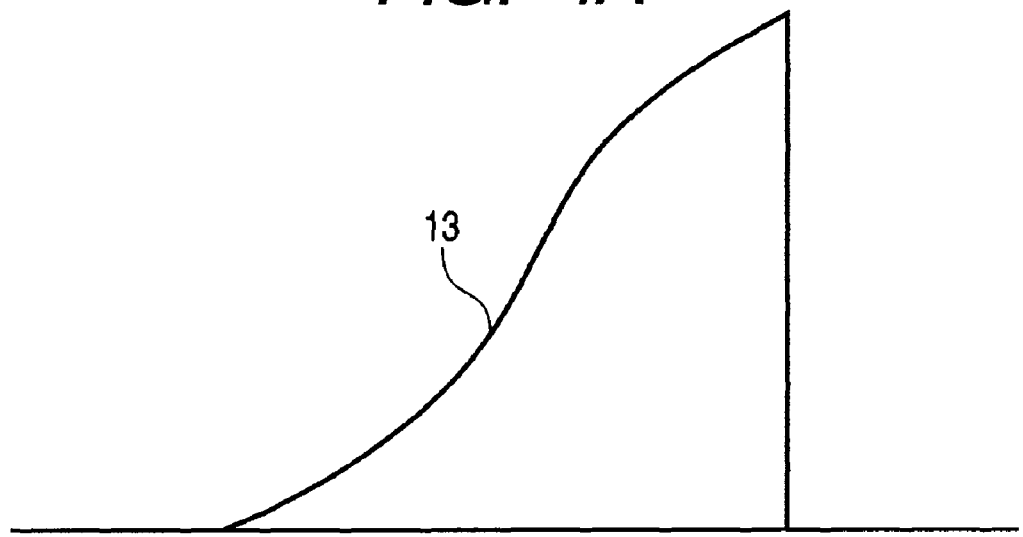
FIGS. 4A and 4B are views illustrating a relationship between a removal depth and a dwell time according to Example 1.
Figure 4B:
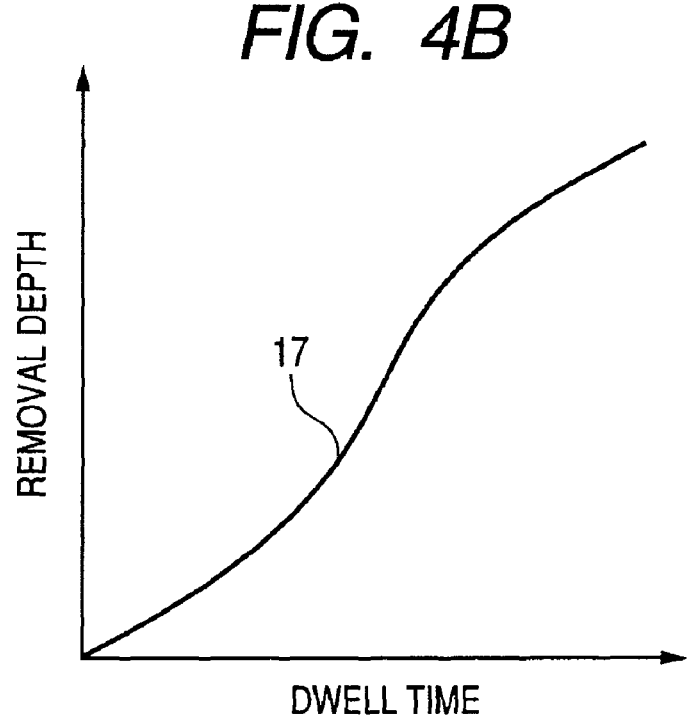

As a method for causing the tool to scan the workpiece, a well-known technology may be used. For example, the workpiece 2 is retained on a table movable in at least one axial direction, and is moved with respect to the tool. As a matter of course, the tool may be moved with respect to the workpiece, or the tool and the workpiece may be moved to each other. Preferably, it is optimum to process with a processing device used in the actual processing. With this, it is possible to obtain the removal shape with respect to the dwell time more highly accurately. In Example 1, the processing is performed while continuously changing the dwell time 9, for example, within a range of from a minimum value of 0.02 sec/mm to a maximum value of 20 sec/mm so that the dwell time is a linear function with respect to a scanning position of the line 10. The minimum value of the dwell time 9 is determined based on the maximum moving speed allowed for the movable table. This is because as the moving speed of the table becomes faster, the dwell time becomes shorter, and because when the moving speed of the table is maximum, the dwell time is minimum. For example, in the case where the maximum moving speed allowed for the movable table is 50 mm/sec, the minimum value of the dwell time 9 assumes 0.02 sec/mm as the reciprocal of the maximum moving speed. The table cannot move at a speed more than the maximum moving speed, and hence the dwell time cannot assume a value smaller than the minimum value described above. Further, the maximum value of the dwell time 9 is determined based on the maximum removal depth estimated for the optical device and the optical device molding die which are subjected to shape finishing. This is because as the desired removal depth becomes larger, the dwell time becomes longer, and because the dwell time is maximum at a point requiring the maximum removal depth. Note that, a precise removal rate cannot be grasped at this point in time, and hence, even when the maximum removal depth to be estimated is known, the dwell time precisely corresponding thereto is unknown. However, in the processing described above, it is only necessary to form a processing shape much the same as a target depth, and it suffices that the approximate dwell time is set based on past cases and the like. For example, in the case where the maximum removal depth to be estimated in shape finishing is 100 nm and the approximate removal rate to be prospected based on the past cases and the like is 5 nm depth/sec, the maximum value of the dwell time 9 is set to about 100/5=20 sec/mm. When the maximum value of the dwell time is extremely large, the processing shape to be formed is extremely deep, which may lead to a risk of deteriorating an accuracy of shape measuring. Thus, it is necessary to determine the maximum value of the dwell time in this way based on the maximum removal depth to be estimated in the actual processing. Thus, the processing is performed while continuously changing the dwell time 9 within the range of from the minimum value to the maximum value so that the dwell time is a linear function with respect to the scanning position of the line 10. FIG. 3B is a view schematically illustrating the workpiece 2 after being subjected to such line processing. In a surface of the workpiece 2 (in the dummy work), a line processing shape 13 as a removal shape by the line processing is formed. FIG. 4A is a view schematically illustrating an enlarged portion of the line processing shape 13, which corresponds to a cross-sectional shape thereof in a direction in which the ion beam 1 performed the scanning. Here, the cross-sectional shape is taken along a width center of the line. The line processing shape 13 is measured by using the shape measuring instrument in the subsequent step, whereby a change of a removal depth or volume could be continuously grasped. As a measuring method, a well-known technology may be used. Typically, the shape measuring is captured as discrete array data having grid-like sampling pitches with equal rows and columns. A high spatial frequency is filtered and removed in this stage. With respect to the cross-sectional shape of the line processing shape 13 calculated as a result of the shape measuring, an approximate curve is determined by a polynomial f(x). FIG. 4B illustrates a removal rate curve 17 representing a relationship between the dwell time and the removal depth, which was drawn by using the dwell time 9 when the ion beam 1 scanned the workpiece 2 along the line 10 and using a result of measuring the depth of the line processing shape 13. As described above, even in the case where there is no proportional relationship between the dwell time and the depth or volume of the removal shape, the actual removal rate curve 17 with respect to the change of the dwell time could be accurately grasped. The removal rate curve 17 can be represented by F(t) obtained by transforming, into a dwell time t, a position x of the polynomial f(x) approximating the cross-sectional shape of the line processing shape 13.

By using the removal rate curve 17, a dwell time distribution for performing the shape correction processing for the workpiece into a target shape is calculated. First, the shape of the workpiece before processing is measured by the shape measuring instrument, and a shape subjected to calculation of a difference with the target shape, that is, a target removal shape E(x, y) is grasped. Then, the target removal shape E(x, y) is subjected to a deconvolution operation with a unit removal shape t(x, y) as is conventionally done, to thereby calculate a tentative dwell time distribution D1(x, y). Here, the unit removal shape t(x, y) only needs to define the removal rate only by the unit time as in the conventional way. The document "Journal of the Japan Society of Precision Engineering: 62 (1996), pp. 408-412" describes the deconvolution operation in detail. Next, the obtained tentative dwell time distribution D1(x, y) is multiplied by a removal rate curve F(t), to thereby calculate a true removal rate R1(x, y) at each point. Then, there is determined a true unit removal shape t1(x, y) which is subjected to scaling in a depth direction so as to conform the unit removal shape t(x, y) to the true removal rate R1(x, y) at each point. In addition, a convolution operation is performed on the true unit removal shape t1(x, y) at every processing position with respect to the tentative dwell time distribution D1(x, y), to thereby calculate a prospect removal shape C1(x, y).

The prospect removal shape C1(x, y) is an actual removal shape in the case of performing the processing using the tentative dwell time distribution D1(x, y). Here, the tentative dwell time distribution D1(x, y) is calculated with the removal rate being defined only by the unit time, and hence there is naturally a large difference between the prospect removal shape C1(x, y) and the target removal shape E(x, y).

In this context, the difference between the target removal shape E(x, y) and the prospect removal shape C1(x, y) is obtained, and thus an error shape E1(x, y) is grasped. Then, with respect to the error shape E1(x, y), a cycle of the deconvolution operation, the multiplication of the removal rate curve F(t), the calculation of the true unit removal shape, and the convolution operation is similarly performed. In other words, a second tentative dwell time distribution D2(x, y) and a second error shape E2(x, y) are calculated.

In the following, calculation is performed in a similar procedure, and, after an nth error shape En(x, y) becomes smaller than a predetermined error, the calculation is terminated. Here, the predetermined error is determined depending on a shape accuracy required for the workpiece. For example, in the case where the shape accuracy required for the workpiece is 0.1 nmRMS, it is desirable that the error at the time of terminating the calculation be about 0.01 nmRMS being one-tenth of the shape accuracy.

Finally, all of the calculated tentative dwell time distributions D1(x, y), D2(x, y) ... Dn(x, y) are combined, and thus a true dwell time distribution D(x, y) with the removal rate curve F(t) being taken into account is calculated.

By using the true dwell time distribution D(x, y) calculated as described above, a behavior of the movable table is NC-controlled using a well-known technology, and the shape correction processing as the actual processing of the workpiece is performed. In the true dwell time distribution D(x, y), the removal rate curve F(t) is taken into account, and hence it is possible to realize the processing more highly accurate than conventional shape correction processing.

As described above, such a high-accuracy dwell time distribution is calculated based on the removal rate more approximate to the actual rate, and the scanning speed of the ion beam 1 is controlled, whereby processing accuracy of the shape correction processing could be enhanced.

The line 10 is illustrated as a straight one. However, as long as the change of the removal depth (volume) can be continuously grasped, the line 10 may be an arbitrary line such as a curve or a rectangular line, or may have a form obtained by processing a certain area.

Example 2

Figure 5A:
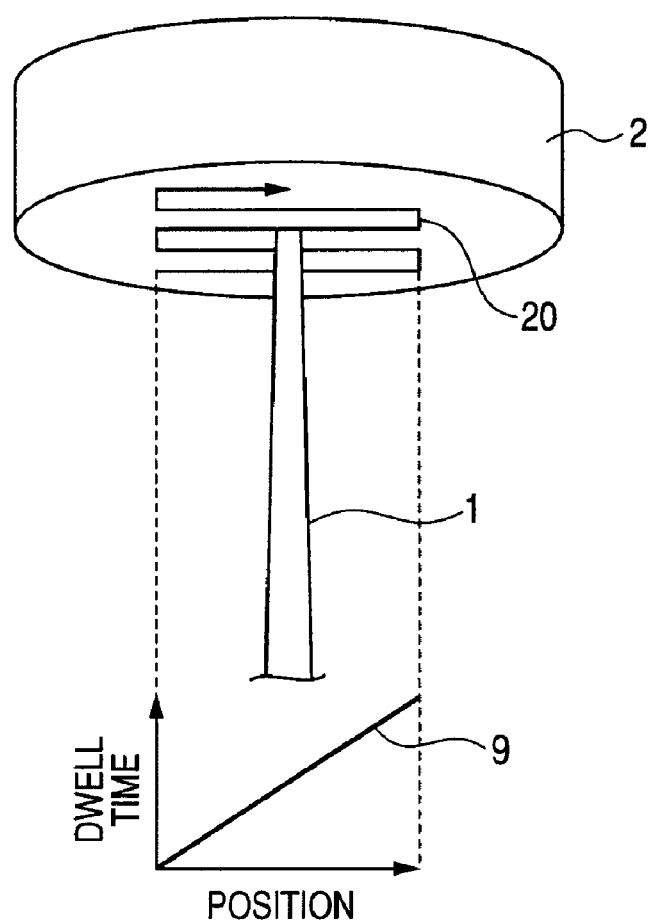
FIGS. 5A and 5B are views illustrating raster processing and a removal shape according to Example 2.

FIGS. 5A and 5B and FIGS. 6A and 6B are views according to Example 2. In Example 2, as illustrated in FIG. 5A, the ion beam 1 as the tool is caused to scan the workpiece 2 as the dummy work along a raster scanning trace 20 while continuously changing the dwell time 9 thereof so that the dwell time 9 is a linear function with respect to a scanning position thereof, and thus the removal shape with respect to the dwell time is determined. In Example 2, the ion beam 1 is used as the tool. However, as a matter of course, the tool is not limited to the ion beam, and a polishing pad, magnetic fluid, an elastic emission machining (EEM) tool, jetted liquid, etching plasma, a laser beam, or the like may be used as the tool.

The workpiece 2 as the dummy work is made of the same material as that for a workpiece to be processed in actual processing. For example, an optical device material including a quartz glass and a low thermal expansion glass, an optical device molding die material including cemented carbide and ceramic, or a semiconductor material including silicon and silicon carbide may be used.

As a method for causing the tool to scan the workpiece, a well-known technology may be used. For example, the workpiece 2 is retained on a table movable in at least two axial directions, and is moved with respect to the tool. As a matter of course, the tool may be moved with respect to the workpiece, or the tool and the workpiece may be moved to each other. Preferably, it is optimum to process with a processing device used in the actual processing. With this, it is possible to obtain the removal shape with respect to the dwell time more highly accurately.

It is preferred that a raster pitch (distance between adjacent scanning lines) of the raster scanning trace 20 be conformed to a raster pitch in the actual processing. This is because a removal rate curve in a state more approximate to the actual processing can be obtained.

In Example 2, the processing is performed while continuously changing the dwell time 9, for example, within a range of from a minimum value of 0.02 sec/mm to a maximum value of 5 sec/mm so that the dwell time is a linear function with respect to a scanning position of the raster scanning trace 20.

The minimum value of the dwell time 9 is determined based on the maximum moving speed allowed for the movable table. This is because as the moving speed of the table becomes faster, the dwell time becomes shorter, and because when the moving speed of the table is maximum, the dwell time is minimum. For example, in the case where the maximum moving speed allowed for the movable table is 50 mm/sec, the minimum value of the dwell time 9 assumes 0.02 sec/mm as the reciprocal of the maximum moving speed. The table cannot move at speed more than the maximum moving speed, and hence the dwell time cannot assume a value smaller than the minimum value described above.

Figure 5B:
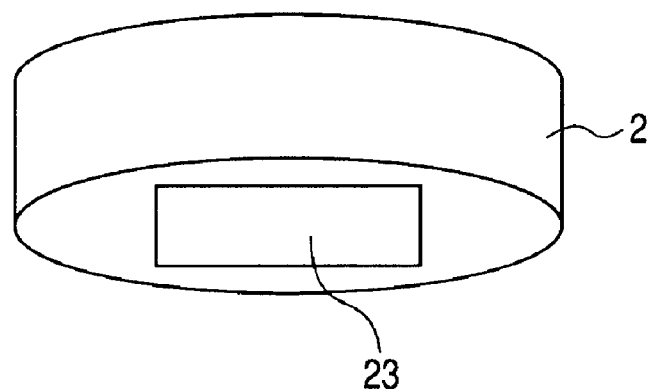
Figure 6A:
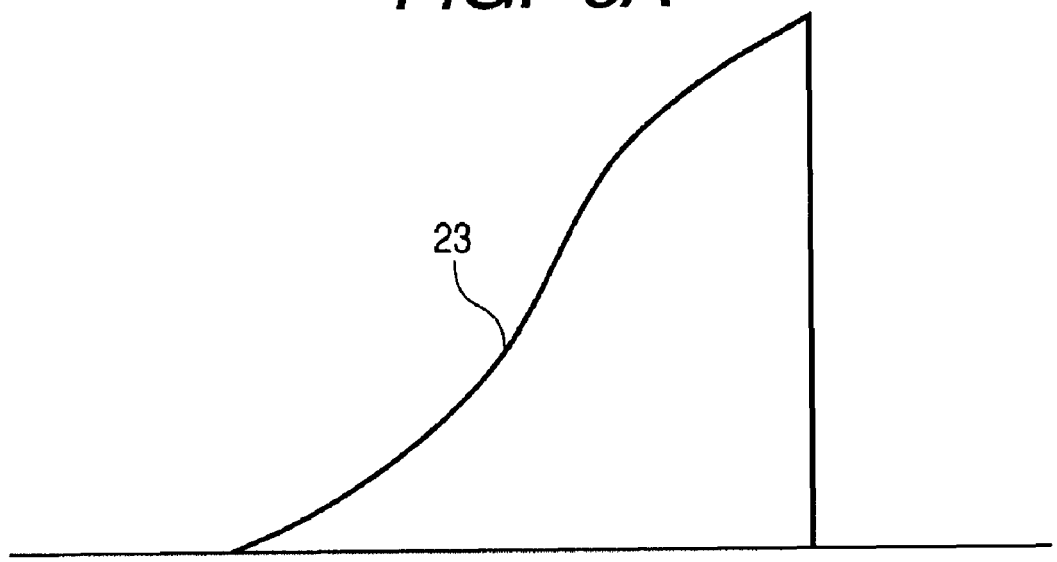
FIGS. 6A and 6B are views illustrating a relationship between a removal depth and a dwell time according to Example 2.

Further, the maximum value of the dwell time 9 is determined based on the maximum removal depth estimated for the optical device and the optical device molding die which are subjected to shape finishing. This is because as the desired removal depth becomes larger, the dwell time becomes longer, and because the dwell time is maximum at a point requiring the maximum removal depth. Note that, a precise removal rate cannot be grasped at this point in time, and hence, even when the maximum removal depth to be estimated is known, the dwell time precisely corresponding thereto is unknown. However, in the processing described above, it is only necessary to form a processing shape much the same as a target depth, and it suffices that the approximate dwell time is set based on past cases and the like. For example, in the case where the maximum removal depth to be estimated in shape finishing is 100 nm, the approximate removal rate to be prospected based on the past cases and the like is 5 nm depth/sec, and the number of times for the tool 1 passing one point on the workpiece 2 due to overlapping of raster scanning is four, the maximum value of the dwell time 9 is set to about 100/5/4=5 sec/mm. When the maximum value of the dwell time is extremely large, the processing shape to be formed is extremely deep, which may lead to a risk of deteriorating an accuracy of shape measuring. Thus, it is necessary to determine the maximum value of the dwell time in this way based on the maximum removal depth to be estimated in the actual processing. Thus, the processing is performed while continuously changing the dwell time 9 within the range of from the minimum value to the maximum value so that the dwell time is a linear function with respect to the scanning position of the raster scanning trace 20. FIG. 5B is a view schematically illustrating the workpiece 2 after being subjected to such raster processing. In the surface of the workpiece 2, a raster processing shape 23 as a removal shape by the raster scanning is formed. FIG. 6A is a view schematically illustrating an enlarged portion of the raster processing shape 23, which corresponds to a cross-sectional shape thereof in a direction in which the ion beam 1 performed the raster scanning. Here, the cross-sectional shape is taken along the width center of the raster. The raster processing shape 23 is measured by using the shape measuring instrument in the subsequent step, whereby a change of a removal depth or volume could be continuously grasped. As a measuring method, a well-known technology may be used. Typically, the shape measuring is captured as discrete array data having grid-like sampling pitches with equal rows and columns. A high spatial frequency is filtered and removed in this stage.

Figure 6B:
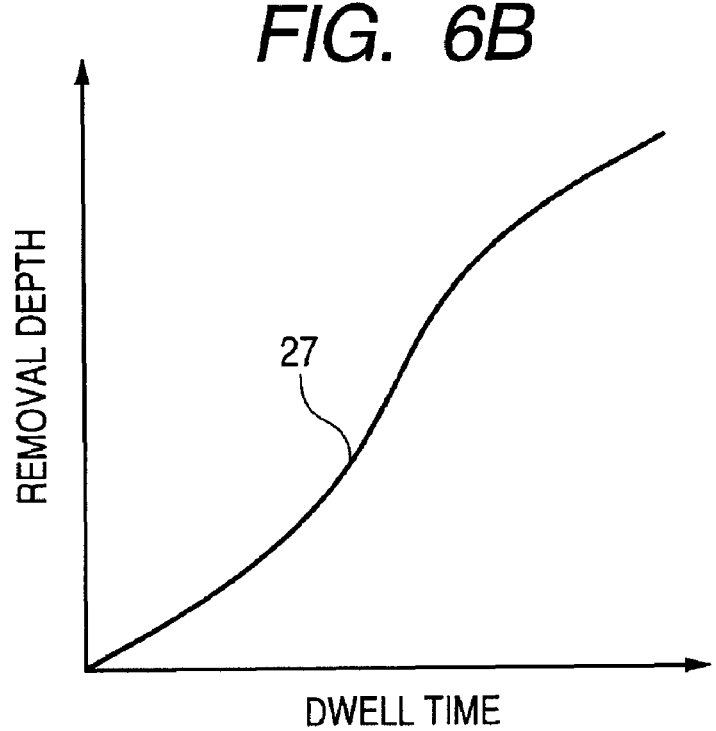

With respect to the cross-sectional shape of the raster processing shape 23 calculated as a result of the shape measuring, an approximate curve is determined by a polynomial f(x). FIG. 6B illustrates a removal rate curve 27 representing a relationship between the dwell time and the removal depth, which is drawn by using the dwell time 9 when the ion beam 1 raster-scanned the workpiece 2 and using a result of measuring the depth of the raster processing shape 23. As described above, even in the case where there was no proportional relationship between the dwell time and the depth or volume of the removal shape, the actual removal rate curve 27 with respect to the change of the dwell time could be grasped.

The removal rate curve 27 can be represented by F(t) obtained by transforming, into a dwell time t, a position x of the polynomial f(x) approximating the cross-sectional shape of the raster processing shape 23.

By using the removal rate curve 27, a dwell time distribution for performing the shape correction processing for the workpiece into a target shape is calculated. First, the shape of the workpiece before processing is measured by the shape measuring instrument, and a shape subjected to calculation of a difference with the target shape, that is, a target removal shape E(x, y) is grasped. Then, the target removal shape E(x, y) is subjected to a deconvolution operation with a unit removal shape t(x, y) as is conventionally done, to thereby calculate a tentative dwell time distribution $D1(x, y)$. Here, the unit removal shape t(x, y) only needs to define the removal rate only by the unit time as in the conventional way. The document "Journal of the Japan Society of Precision Engineering: 62 (1996)408" describes the deconvolution operation in detail. Next, the obtained tentative dwell time distribution $D1(x, y)$ is multiplied by a removal rate curve F(t), to thereby calculate a true removal rate $R1(x, y)$ at each point. Then, there is determined a true unit removal shape $t1(x, y)$ which is subjected to scaling in a depth direction so as to conform the unit removal shape t(x, y) to the true removal rate $R1(x, y)$ at each point. In addition, a convolution operation is performed on the true unit removal shape $t1(x, y)$ at every processing position with respect to the tentative dwell time distribution $D1(x, y)$, to thereby calculate a prospect removal shape $C1(x, y)$.

The prospect removal shape $C1(x, y)$ is an actual removal shape in the case of performing the processing using the tentative dwell time distribution $D1(x, y)$. Here, the tentative dwell time distribution $D1(x, y)$ is calculated with the removal rate being defined only by the unit time, and hence there is naturally a large difference between the prospect removal shape $C1(x, y)$ and the target removal shape E(x, y).

In this context, the difference between the target removal shape E(x, y) and the prospect removal shape C1(x, y) is obtained, and thus an error shape E1(x, y) is grasped. Then, with respect to the error shape E1(x, y), a cycle of the deconvolution operation, the multiplication of the removal rate curve F(t), the calculation of the true unit removal shape, and the convolution operation is similarly performed. In other words, a second tentative dwell time distribution D2(x, y) and a second error shape E2(x, y) are calculated.

In the following, calculation is performed in a similar procedure, and, after an nth error shape En(x, y) becomes smaller than a predetermined error, the calculation is terminated. Here, the predetermined error is determined depending on a shape accuracy required for the workpiece. For example, in the case where the shape accuracy required for the workpiece is 0.1 nmRMS, it is desirable that the error at the time of terminating the calculation be about 0.01 nmRMS being one-tenth of the shape accuracy.

Finally, all of the calculated tentative dwell time distributions D1(x, y), D2(x, y) ... Dn(x, y) are combined, and thus a true dwell time distribution D(x, y) with the removal rate curve F(t) being taken into account is calculated.

By using the true dwell time distribution D(x, y) calculated as described above, a behavior of the movable table is NC-controlled using a well-known technology, and the shape correction processing as the actual processing of the workpiece is performed. In the true dwell time distribution D(x, y), the removal rate curve F(t) is taken into account, and hence it is possible to realize the processing more highly accurate than conventional shape correction processing.

As described above, a high-accuracy dwell time distribution is calculated based on the removal rate more approximate to the actual rate, and the scanning speed of the ion beam 1 is controlled, whereby processing accuracy of the shape correction processing can be enhanced.

In particular, a scanning mode of the shape correction processing and a scanning mode of the method for grasping the removal rate conform to each other in the raster scanning, and hence the processing accuracy of the shape correction processing can be further enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-163752, filed Jul. 10, 2009, which is hereby incorporated by reference herein in its entirety.

What is claimed is:

1. A method for processing a workpiece in which a tool smaller than the workpiece is caused to scan the workpiece, the method comprising the steps of:
    dwelling a tool on a dummy work for a predetermined time to process the dummy work;
    measuring the dummy work to determine a unit removal shape;
    causing the tool to scan the dummy work, and processing the dummy work while continuously changing a dwell time of the tool so that the dwell time is a linear function with respect to a scanning position of the tool;
    measuring a change of a depth or volume of a removal shape processed in the dummy work, to thereby determine a removal rate corresponding to a continuous change of the dwell time of the tool;
    determining a tentative dwell time to dwell the tool at respective processed points from a target removal shape of the workpiece and the unit removal shape;
    determining the removal rate corresponding to the tentative dwell time at the respective processed points;
    determining a true dwell time at the respective processed points from the removal rate at the respective processed points; and
    dwelling the tool for the true dwell time at the respective processed points to process the workpiece.

2. The method according to claim 1, wherein a scanning mode of the tool comprises raster scanning.

3. The method according to claim 1, wherein the tool is an ion beam.

4. The method according to claim 1, wherein the tool is a polishing pad.

5. The method according to claim 1, wherein the tool is etching plasma.

6. The method according to claim 1, wherein the workpiece is an optical device.

* * * * *